United States Patent [19]

Andersen et al.

[11] Patent Number: 4,832,530
[45] Date of Patent: May 23, 1989

[54] APPARATUS AND METHOD FOR JOINING PIPE SECTIONS UNDERWATER

[76] Inventors: Scott F. Andersen, 1705 Edgecliff Terrance, Lake Oswego, Oreg. 97034; Norman L. Hooper, 3051 Ruidoso Court, West Linn, Oreg. 97065; Kent C. Werle, 28613 185th Ave., S.E., Kent, Wash. 98042

[21] Appl. No.: 153,351
[22] Filed: Feb. 8, 1988
[51] Int. Cl.⁴ .............................................. F16L 1/04
[52] U.S. Cl. .................... 405/170; 81/57.24; 81/57.4; 29/237; 285/39; 405/169; 405/158; 405/191
[58] Field of Search ............... 405/169, 170, 171, 188, 405/190, 191; 285/39; 29/237, 267; 81/57.24, 57.4

[56] References Cited

U.S. PATENT DOCUMENTS

| | | | |
|---|---|---|---|
| 2,470,897 | 5/1949 | Niederhiser | 81/57.4 X |
| 3,166,123 | 1/1965 | Watkins | 405/191 X |
| 3,578,233 | 5/1971 | Meister | 405/171 X |
| 3,717,920 | 2/1973 | Oliver et al. | 405/170 X |
| 3,840,968 | 10/1974 | Mason | 29/237 |
| 4,014,180 | 3/1977 | Kelly et al. | 405/170 |
| 4,039,087 | 8/1977 | Sandvick | 29/237 |
| 4,068,492 | 1/1978 | Reneau | 405/170 |
| 4,094,163 | 6/1978 | Ells et al. | 405/170 |
| 4,443,129 | 4/1984 | de Sivvy et al. | 405/170 |
| 4,674,915 | 6/1987 | Shatto | 405/191 |

Primary Examiner—Dennis L. Taylor
Attorney, Agent, or Firm—Robert L. Harrington

[57] ABSTRACT

Apparatus for laying large pipe sections underwater without on-site manual participation. A beam is releasably attached to a pipe section that is to be lowered to the floor of the water body and attached to the open end of the previously laid pipe section. A positioning fork depending from the beam is settled onto the prior pipe section with the fork legs straddling the pipe and assuring alignment of the pipe ends. Positioning rams in cooperation with landing gears on the fork legs achieve concentric abutment of the end flanges. The flange on the new pipe section is rotatable and a positioner from the beam is releasably attached to the rotatable flange and rotated therby to align bolt holes through the flanges. A wrench carried on a rigging releasably attached to the new pipe section behind the flange is movable between the bolt holes and pushes bolts partially pre-inserted in the bolt holes through the flanges and into engagement with nuts pre-positioned behind the bolt holes of the fixed flange. Surveillance cameras enable an operator to view the operations and upon completion, the beam, flange positioner and rigging are released from the pipe and raised to the water's surface.

20 Claims, 6 Drawing Sheets

APPARATUS AND METHOD FOR JOINING PIPE SECTIONS UNDERWATER

FIELD OF THE INVENTION

This invention relates to the laying of large pipe, e.g. 3 to 10 feet in diameter, along the floor of a large body of water, such pipe being provided in long sections of, e.g. 500–1000 foot lengths, and the invention more particularly related to the apparatus and method for joining the pipe sections beneath the water's surface.

BACKGROUND OF THE INVENTION

Huge pipelines are used to transport liquid materials of varying kind over many miles. Often it is desirable to extend the pipeline across the floor of large bodies of water, e.g. lakes and ocean bays. Typically the pipe sections are fabricated in lengths as long as feasible for handling. The lengths are then positioned in sequence along the selected route and joined together, each new section being positioned and joined to the end of the pipeline of previously interconnected sections.

The procedure for assembling the pipe sections underwater, as when spanning a lake or ocean floor, presents special problems. The assembling process previously employed requires manual handling of certain aspects of the process. Assemblers in an underwater situation are required to perform the work in diving suits or through manipulators on specially-designed submarines. Such underwater manual participation is difficult, time-consuming, dangerous, and very costly.

Pipeline sections as contemplated for the present invention are huge, in the range of 3 to 10 feet in diameter, up to 1000 feet in length and weighing many thousands of pounds. The sections are typically transported on large barges or by fastening floats to the pipe and towing them to the job site. At the job site, large cranes carried by barges or ships are employed to unload or detach the pipe sections from the barge or floats and lower them into the water. Manual participation up to this point involves attaching some kind of harness to the pipe for hook up to the crane, manipulation of the crane, and visual observation and direction of the handling process by supervisors, all accomplished by personnel from above the water's surface.

Once the pipe section is lowered into the water, the tasks involve various forms of; positioning the pipe section (properly oriented end-to-end) adjacent the pipe section previously laid; bringing an end flange of the new pipe section into abutment with an end flange of the prior pipe section so that bolt holes through the two flanges are aligned; inserting bolts through the aligned bolts holes and threading nuts onto the bolt ends; and releasing the harness from the pipe which is then brought to the water's surface for attachment to and laying of the next pipe section.

SUMMARY OF THE INVENTION

The apparatus of the present invention accomplishes the above tasks without on-site (underwater) assistance of an assembler. (For the purpose of explanation, hereafter the pipe section being laid will be referred to as the new pipe section, and the pipe section previously laid and to which the new pipe sections are to be attached will be referred to as the prior pipe section.)

The pipe sections are provided with a flange at one end that is journaled for rotation about the pipe (referred to as the rolling or rotatable flange). A flange at the opposite end is fixed. Both flanges are provided with bolt holes. Thus with the rotatable-flange-end of a new pipe section abutted against the fixed-flange-end of a prior pipe section, the rotatable flange can be rotated to align the bolt holes of the two flanges. At the fixed flange end, the pipe sections are fitted with a nut retainer ring having sockets that carry nuts to be screwed onto bolts inserted through the bolt holes. The nuts, so contained, are aligned behind the bolt holes of the fixed flanges. The sockets of the retainer ring are designed to permit the nuts to "float" in the socket in a manner to assist alignment with the bolts.

A rigid steel beam extends over the top of the new pipe section and carries grippers that clamp onto the rotatable-flange-end of the new pipe section. These grippers are fastened to the new pipe section before it is lowered under the water. One end of the beam extends past the end of the pipe section and carries a fork-like appendage with legs that are maneuvered to straddle the prior pipe section behind the fixed flange (and behind the nut retainer ring) of the prior pipe section. Positioning rams are carried by the fork legs which are remote-control actuated from above the water to push against the nut retaining ring and through it against the flange to force the two flanges into abutment.

A rigging is strapped around the new pipe section just behind the rotatable flange, again attached to the pipe at the surface of the water. The rigging carries wrenches that travel on the rigging and thus around the pipe in response to a control panel located above the water. The holes of the rotatable flange are pre-fit with bolts having a pilot end portion followed by a threaded portion. The wrenches are maneuvered on the rigging into alignment with the head of the bolt. With the bolt holes of the two flanges aligned, a wrench is extended to first engage the bolt head, and then push it through the flanges and into the nut positioned behind the fixed flange bolt hole. The pilot portion of the bolt forces alignment of the nut (as permitted by the floating feature of the socket) and then the bolt is turned to screw the nut onto the threaded section of the bolt. The wrench which is commonly referred to as an impact wrench, is pressure and flow controlled to achieve the desired tightening.

The wrench action is repeated for the numerous bolts and bolt holes around the circumference of the flange. Upon completion, the apparatus including the rigging, is detached from the pipe section and raised to the surface to repeat the procedure with a succeeding new pipe section. The entire operation is assisted by surveillance cameras strategically located on the apparatus.

Having thus briefly described a preferred embodiment of the present invention, the reader is referred to the following detailed description and drawings for a further understanding of the invention.

DESCRIPTION OF THE PREFERRED EMBODIMENT

Figures 1, 9:
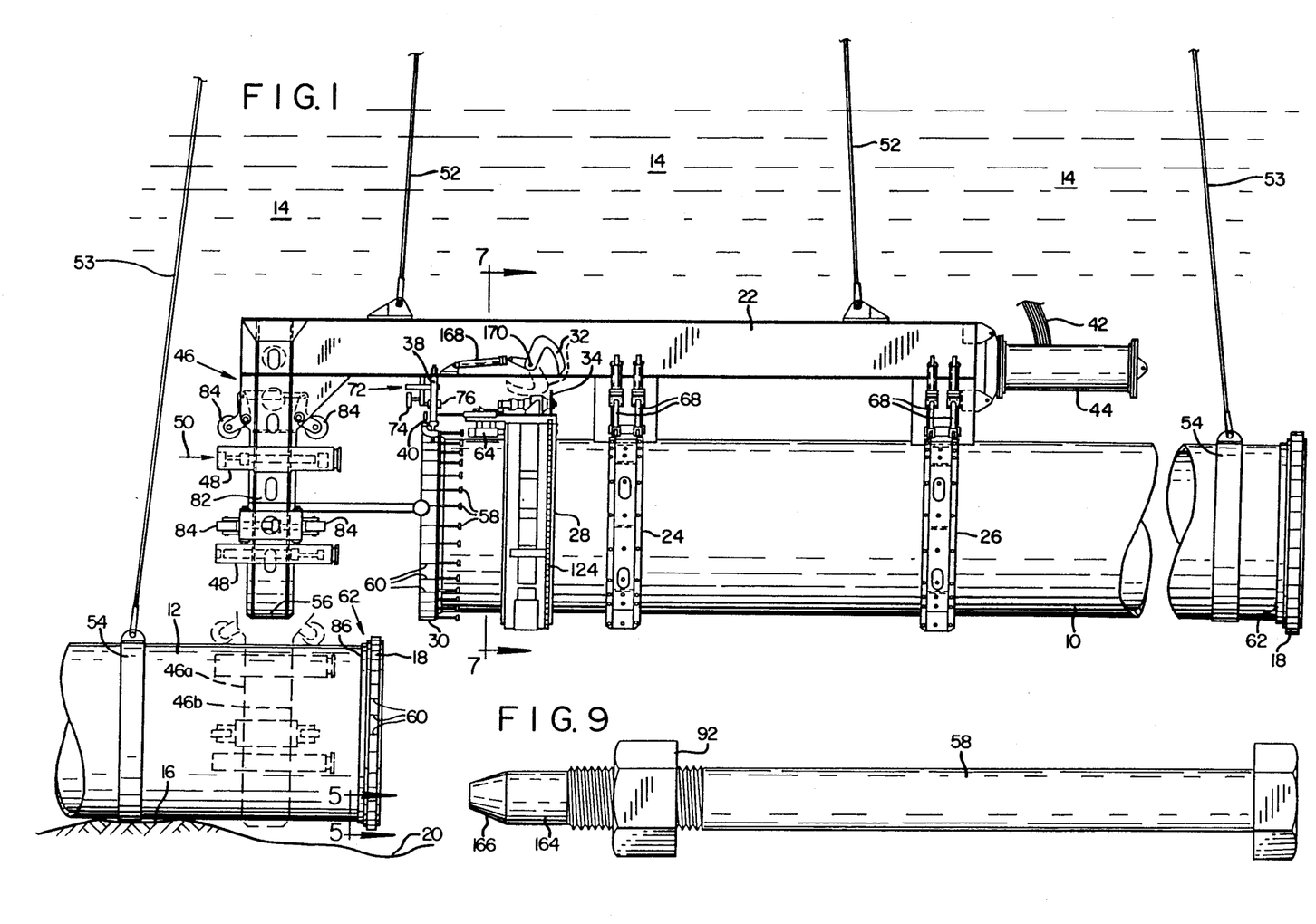
FIG. 1 illustrates, somewhat schematically, an underwater pipe laying operation using an apparatus and method of the present invention.
FIG. 9 is an enlarged view of the bolt used to bolt up the two pipe sections.

It is believed that the reader will better appreciate the individual components of the apparatus to be described if the over all performance criteria is understood. FIG. 1 is more or less a schematic illustration of the apparatus as it is utilized to set a new pipe section 10 into position for alignment with a prior pipe section 12. FIG. 1 is intended to primarily illustrate the method of operation. Certain features have been disproportionately enlarged and others eliminated from FIG. 1 to aid the reader in an understanding of the apparatus and method of operation in general. It will also be helpful to refer to the pictorial illustration of the apparatus in FIG. 2 throughout this part of the description.

Wave lines 14 are to indicate that the assembly process takes place under water with the prior pipe section 12 resting on the floor 16 of the water body. It will be noted that the flange 18 of the prior pipe section 12 is raised off of the floor, a dip or concavity 20 being indicated. Clearance under the pipe end is contemplated for this embodiment of the invention. The manner of providing such clearance is not a part of this invention. It may be provided naturally as indicated. The concavity may also be provided by digging a trench under the pipe end. Another method is to provide a means to raise the pipe end which would normally require that the pipe be slightly bendable. In any event, this embodiment of the invention contemplates a clearance provided under the pipe end.

The apparatus illustrated in FIG. 1, attached to the new pipe section, includes a main support beam 22 that is secured to the new pipe section 10 by front and rear grippers 24,26. A wrench-carrying rigging 28 is strapped around the pipe just behind the flange 30. The rigging 28 is attachable to and detachable from the main support beam 22 by hook members 32 engaging rungs 34 (a hook 32 being provided on each side of beam 22). As illustrated, during the process of interconnecting the two pipe ends, the rigging 28 is detached from the main support beam except for the control line 36.

The flange 30 is rotatable. (Hereafter this flange will be referred to as the rotatable flange. The flange at the opposite end of the pipe section will be referred to as the fixed flange. In instances where various components are identified as having a location relative to the flanges, such positioning will be considered as being inwardly of the flange, i.e. towards the center of the pipe section or outwardly thereof.) Rotation of the flange 30 is controlled by a hydraulically actuated positioner 38 that engages an eyelet 40 provided on the pipe flange.

It will be appreciated that the apparatus illustrated has four hookups to the new pipe section. They include the two grippers 24,26, the rigging 28 and the hydraulic positioner 38. All four have control features that are controlled by an operator located above the water's surface. Such control is enabled by control lines 42 that protrude out of a control housing 44 mounted to the rear of the main support beam 22, and extend to a control panel above the water's surface (on board a ship) under the supervision of the operator. The lines running to the various hookups, including lines 36, are secured to the side of beam 22 from the housing 44.

A fifth component of the apparatus is a positioning fork 46 fixedly attached to the end of beam 22 and projected outwardly of flange 30 of the new pipe section. Fork 46 has two legs that straddle the pipe. As illustrated in FIG. 1, fork 46 has been positioned over the outer end of prior pipe section 12, just behind the fixed flange 18 of that pipe section.

Figure 2:
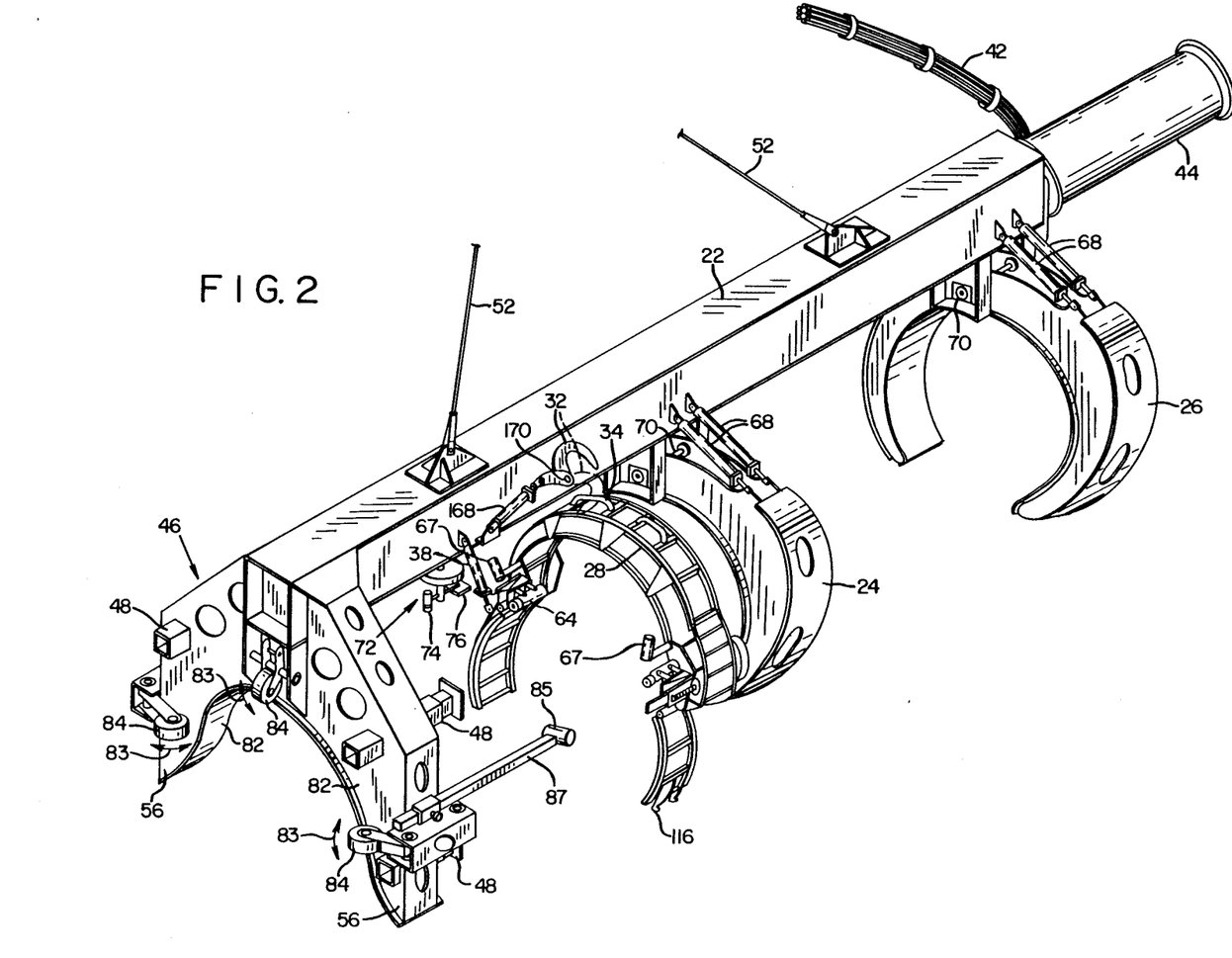
FIG. 2 is a perspective view of the apparatus of FIG. 1.

Each leg of the fork 46 is provided with a pair of positioning rams 48 which is extendable as indicated by arrow 50. The rams 48 are controlled from the operator's control panel, again by lines running along beam 22 to control housing 44 and then through the bundle of control lines 42.

It will be appreciated that the four hookups to the new pipe section are accomplished while the new pipe section is located at the water's surface. Beam 22 is lowered to the position illustrated in FIG. 1 by a crane controlling a series of lines 52, two of which are connected to the support beam 22. Beam 22, through grippers 24,26 will support, through lines 52, the rotatable flange end of the pipe. Whereas the pipe section 10 is in the order of 1000 feet in length, a number of additional lines 53 are required, only one of which is illustrated as being tethered to a band 54 at the outer end of the pipe section. As noted, the line 53 at the far end near the fixed flange 18 is left on the prior pipe section as an aid to the crane operator as the new pipe section is lowered into place.

Cameras, which are not shown in FIG. 1, but note reference 72 of FIG. 2, enable the crane operator to lower the pipe section 10 to the position illustrated in FIG. 1, i.e. with the fork 46 positioned over the end of the prior pipe section 12. The fork tips 56 are flared so that some misalignment is tolerated and the apparatus and new pipe section are simply cammed into alignment as the apparatus and pipe is lowered into position. When the fork 46 is fully lowered to loosely captivate the pipe section 12, the two pipe sections 10 and 12 are substantially in alignment. Bringing the flanges 18 and 30 into concentricity and end-to-end abutment and then bolting them together is the next step of the operation.

Before explaining the abutting and bolting operations, the reader should first appreciate that certain features are provided directly on the pipe sections. Flange 30 is a rotatable ring, the rotation of which is controlled by positioner 38, as previously explained. The ring is provided with bolt holes and bolts 58 are pre-set into the holes but are retracted so as not to project past the flange. Lines 60 are marked on the outer edge of the ring to indicate the center line of the bolt holes.

At the opposite end of each pipe section the flange 18 is fixed, i.e. non-rotatable, but is otherwise mated to the rotatable ring flange 30. Bolt holes through flange 18 exactly mate with the bolt holes of flange 30 when properly aligned. The outer edge of flange 30 is similarly provided with marking lines 60 to indicate the hole alignment. By bringing the two flanges together so that the markings 60 of the two flanges are aligned, the bolt holes are thus aligned.

Also provided at the outer end behind the fixed flange is a retaining ring 62. Retaining ring 62 is preferably a wood ring designed with special sockets that retain nuts to be threaded onto bolts 58. The sockets are spaced around the ring 62 in exact alignment with the holes through the flange 18. The nuts are allowed some float in the socket as will be explained in a later section.

Returning now to the aligning and bolt-up procedure, with the apparatus and new pipe section lowered so that fork 46 is loosely seated onto the prior pipe section (see dash lines 46a) the flanges 18 and 30 are in substantial alignment one-to-the-other, but not in abutment and most probably not with the bolt holes aligned.

The next step is to achieve concentricity and abutment. Rams 48 are extended which forces the fork 46 away from the flange 18 rearwardly along the length of the pipe section 12 (see dash lines 46b). As the fork is fixed to the beam 22, and as the beam 22 is fixed to the front and rear grippers 24,26, and as the front and rear grippers are securely gripping pipe section 10; accordingly, the flange 30 of pipe section 10 is moved toward flange 18 until they are adjacent one another, but not yet in abutting relationship. Flanges 18 and 30 are brought into concentricity by hydraulically manipulating three landing gears (rollers 84) and then full abutment is achieved by continued extension of rams 48.

The next step is to achieve hole alignment. Again a camera (camera 74 shown in FIG. 2) views the marking lines 60. If misaligned, as they most surely are, positioner 38 is activated to rotate the rotatable ring flange 30 until lines 60 of the respective flanges are aligned. With the hole aligned the pipe sections are ready to be bolted together.

The function of the wrench-mounting rigging 28 is to insert and tighten bolts 58. The pressure-and-flow actuated impact wrenches 64 are mounted on carriages 66 that are movable around a track on the periphery of the rigging 28. The wrench can also be tilted inwardly toward or outwardly from the axis of the pipe. Thus with the combination of moving the carriage and tilting the wrench, the wrench socket can be aligned with the bolt head. Once engaged, the wrench is activated to push the bolts into and through flange 18 and into engagement with the nuts being retained in the sockets of retaining ring 62. The bolts are turned by the wrench until the desired preset torque is reached. The wrench 64 is retracted and the carriage 66 and wrench 64 are moved to the next bolt where the process is repeated.

When all the bolts are inserted and tightened and the seal between the flanges 18 and 30 checked for leakage, the apparatus is unbuckled and raised back to the surface. Such unbuckling involves retraction of rams 48, disconnecting positioner 38 from eyelet 40, engagement of hooks 32 with rungs 34, releasing hook 116 and opening arms 112a and 112b of the rigging 28, and opening of grippers 24,26 through retraction of positioners 68. The apparatus can then be simply lifted off the pipe section, and raised to the water's surface and re-attached to a new, new pipe section to be attached to the just laid pipe section (now the prior pipe section).

The individual features will now be explained in detail. They will be described as a first section including the features that achieve alignment and abutment of the pipe ends; and a second section including the features that achieve alignment of the bolt holes in the flanges and the bolt-up of those flanges

Pipe End Alignment

Reference is made to FIGS. 1 and 2. The pipe end aligning process does not require a great detail of mechanism. The support beam 22 must be massive for handling the huge pipe section 10 and is preferably in the order of 40 feet in length. The valving for the various controls is contained in the housing 44 and is of conventional design, well within the skill of a hydraulics control designer. The details are not shown to avoid undue complexity. It will suffice to point out that the bundle of lines 42 extend from the housing 44 to a control panel on the water's surface (e.g. on board a ship) and enables an operator to control all the functions of the apparatus herein described.

The grippers 24,26 are each comprised of a pair of gripping arms pivoted at 70 for opening and closing of the arms around the pipe section. Such opening and closing of the gripper arms are achieved by activation of a pair of hydraulic actuated positioners 68 for each gripper arm. The grippers are, of course, positioned and closed over the rolling flange end of the new pipe section while the pipe section is supported on a barge or by floats on the water's surface.

The apparatus being securely clamped to the pipe section by the grippers 24,26 and the bands 54 positioned at spaced increments along the pipe section, the crane operator, through lines 52, takes over the support of the pipe section for lowering. The pipe section is then controllably lowered into the water.

In a prior experimental application of the apparatus, the total support for the pipe was through bands 54. The apparatus being of substantial mass and affixed to the top of the pipe section, made the total structure top heavy, generating a tendency for the structure and pipe to roll. This tendency was corrected by connecting certain of the lines 52 to the beam 22.

Figure 3:
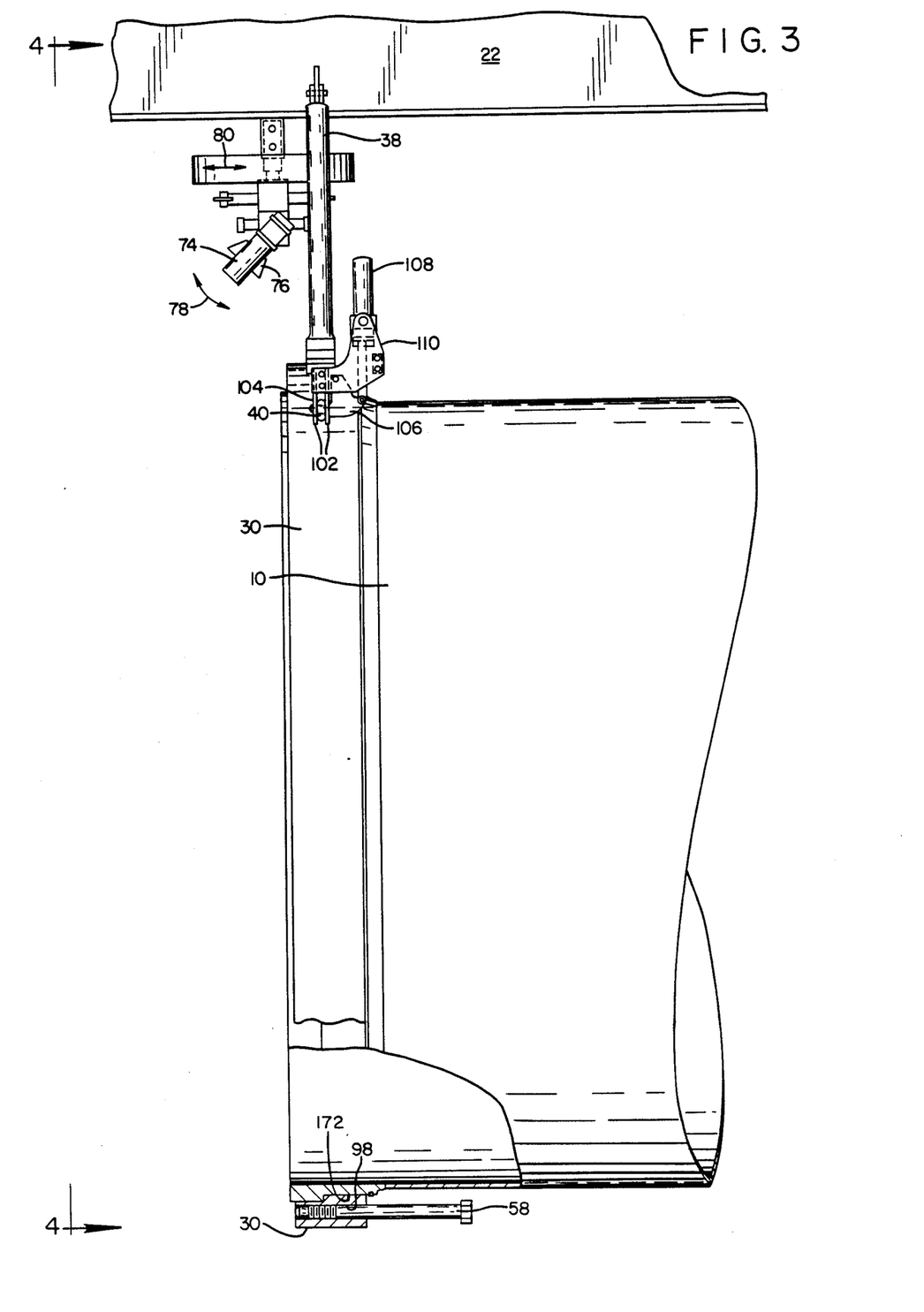
FIG. 3 is an enlarged view of a portion of the apparatus including the surveillance camera mounting and the rotating flange adjustment feature.

An important feature for both pipe end alignment and bolt-up operation is the surveillance feature that enables the operator to view the pipe ends. Referring to FIGS. 2 and 3, depending from beneath the beam 22 at a position just above and at the forward edge of the rolling flange of the new pipe section is a viewing structure 72 consisting of a camera 74 and a light source 76. The viewing structure 72 includes a light/camera tilt capability indicated by arrow 78, and a rotating or pan capability indicated by arrow 80, both of which movements are controlled by the operator.

With the scanning capability of the camera and with the position of the camera over the pipe end, the operator is able to view the relative positioning of the two flanges as they are brought together. As will be later described, the operator is able to view the process of aligning the bolt holes as well.

The beam 22 extends out over the rotatable flange end of the new pipe section and carries an aligning fork 46 as can be readily observed in FIGS. 1 and 2. The fork 46 includes a pair of legs 82 that are cooperatively configured to form a curve substantially conforming to the curvature of the upper half of the pipe, with each leg tip 56 being flared outwardly as best seen in FIG. 2. The flared tips 56 allow for limited misalignment of the new pipe section being lowered into place over the end of the prior pipe section illustrated in FIG. 1. The operator will, of course, have control over this positioning operation through maneuvering of support lines 52 and 53, and he is able to observe the relative position of the pipe ends. Thus the limited adjustment that is provided by the flange fork tip ends is sufficient to bring the two pipe ends into the desired close end-to-end alignment.

With the apparatus settled onto the prior pipe section end indicated by dash lines 46a in FIG. 1, the actual contact by the fork is provided by top and side rollers 84 mounted on positioners for extending the rollers from the fork legs 82 toward the pipe as indicated by arrows 83 as shown in FIG. 2 (the combination of rollers and positioners sometimes hereafter referred to as landing gears). The landing gears are independently operated by the operator to "fine tune" the alignment of the flange ends 18,30 as will be subsequently explained.

The two legs 82 each also carry upper and lower positioning rams 48 that are in a retracted position as the apparatus is positioned onto the prior pipe end. When the operator is satisfied that he has achieved the desired roughly positioned end-to-end alignment of the pipe ends, he activates the rams which are extended to engage the retaining ring 62 behind the flange 18, thereby forcing movement of the apparatus inwardly on the pipe. Such movement is aided by the rollers 84 and, or course, this movement achieves drawing of the new pipe section toward the prior pipe section until the flanges 18 and 30 are in close abutment. The operator is then able to view the alignment fit of the flanges through the several camera and light assemblies including an upper camera assembly 72 depending from beam 22 and side camera and light assemblies 85 on positioners 87 extended from the two fork legs 82 (only one of which is shown in FIG. 2). The operator may adjust the hole alignment at this point by aligning line markings 60 of the two flanges explained in the bolt-up section. At any rate, the operator manipulates the landing gears (rollers 84) to attain exact concentricity and then the positioning rams are activated to obtain full abutment. The operator is then ready for the bolt-up operation which will now be described. Bolt-up As explained above, a nut retaining ring 62 (FIG. 1) is provided behind flange 18 on the fixed flange end of each pipe section. This nut retaining ring 62 may be provided when the pipe section is manufactured, or it may be provided just prior to lowering the pipe section into the water. In any event, the retaining ring is intended to be permanently affixed to the pipe section and will accordingly remain on the pipe section when the apparatus is removed following bolt-up.

Figures 5, 7:
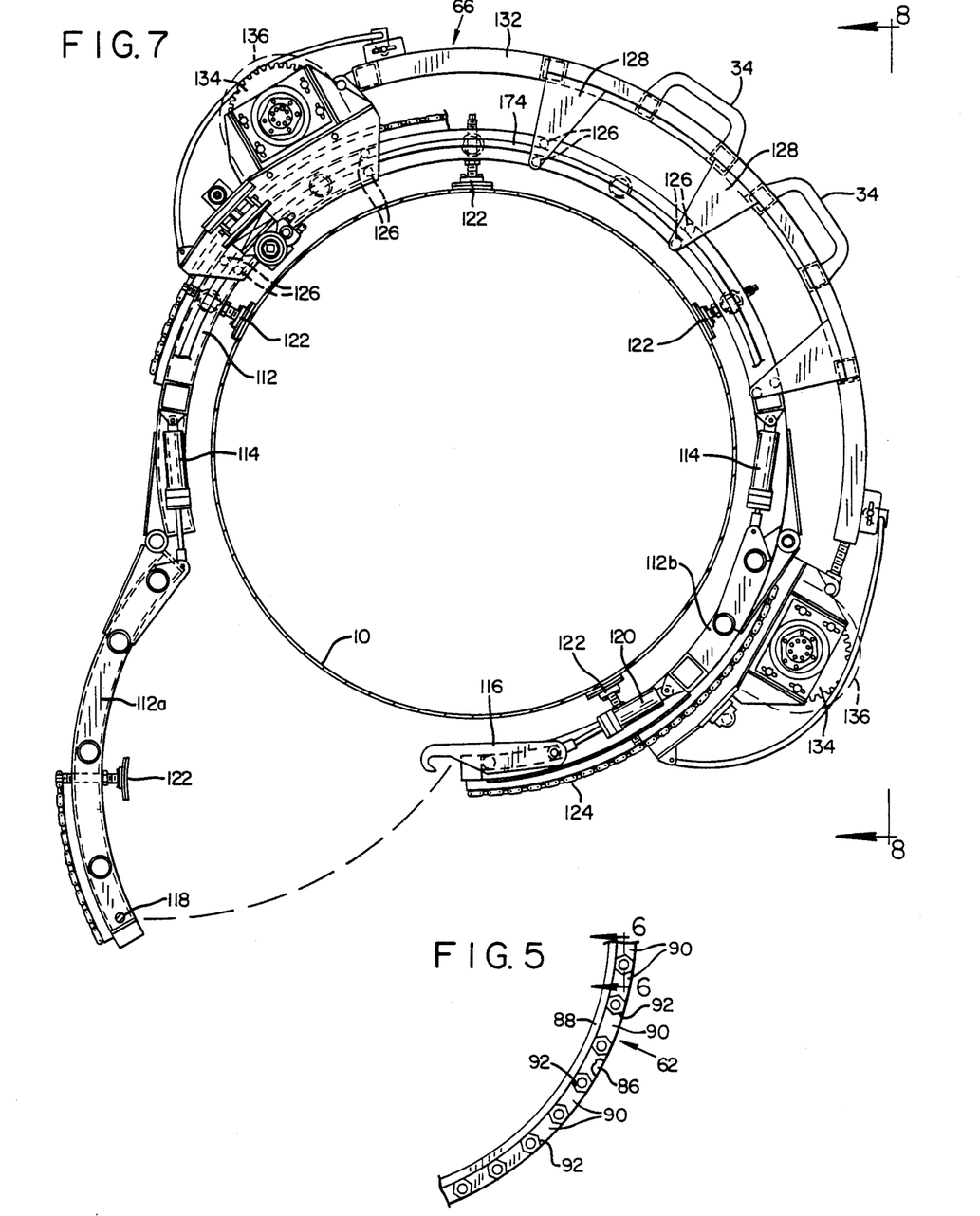
FIG. 5 is a view of a portion of the nut retainer ring as viewed on view lines 5—5 of FIG. 1.
FIG. 7 is a view of the wrench-carrying rigging as taken on view lines 7—7 of FIG. 1.
Figure 6:
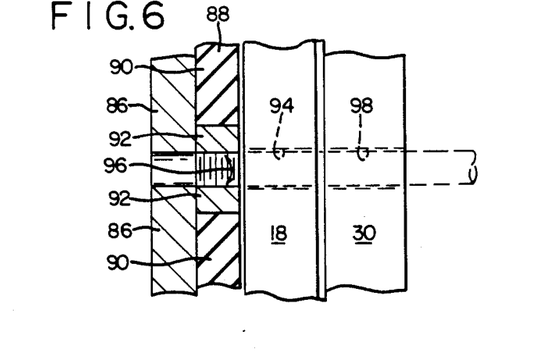
FIG. 6 is a section as taken on view lines 6—6 of FIG. 5.

The retaining ring structure is more clearly viewed in the partial sections view of FIG. 5 taken on view lines 5—5 of FIG. 1, and FIG. 6 taken on view lines 6—6 of FIG. 5. As seen in FIGS. 5 and 6, the retaining ring is comprised of a continuous ring including a backstop portion 86 and a side edge portion 88 which provides an L-shaped groove. provided in the L-shaped groove at spaced positions around the ring are butterfly keepers 90. The butterfly keepers are resilient, preferably of a rubber material. They are shaped with V-shaped sides that face in the lengthwise direction of the L-shaped groove, i.e. successive keepers have V-shaped sides facing one another as seen in FIG. 5. The spacing between the keepers are provided to form, with the rigid side edge 88 a five-sided socket (a sixth side being open) that is adapted to receive and retain a hexagon nut 92. The sockets are spaced the exact spacing of the bolt holes through the flange 18. The nuts are placed in the sockets and the retaining ring is fastened to the pipe section so that the nuts are positioned, open face toward the bolt holes and in line with the bolt holes. Note in FIG. 6 the dash line indication of flange 18 and the bolt hole 94 therethrough.

It will be appreciated that rams 48 are pressing the retaining ring against the flange 18, i.e. in pushing engagement with the flange (see FIG. 1). It will be further appreciated that whereas edge 88 prevents the nuts 92 from turning, and backstop 86 (backed by the rams 48) prevent the nut from being pushed away from the bolt holes 94, the nuts are able to adjust around a radial axis as indicated by arrow 96, such adjustment being permitted by reason of the resilience of keepers 90. This adjustment is sometimes referred to as a floating adjustment of the nuts, the purpose of which will be subsequently explained.

Figure 4:
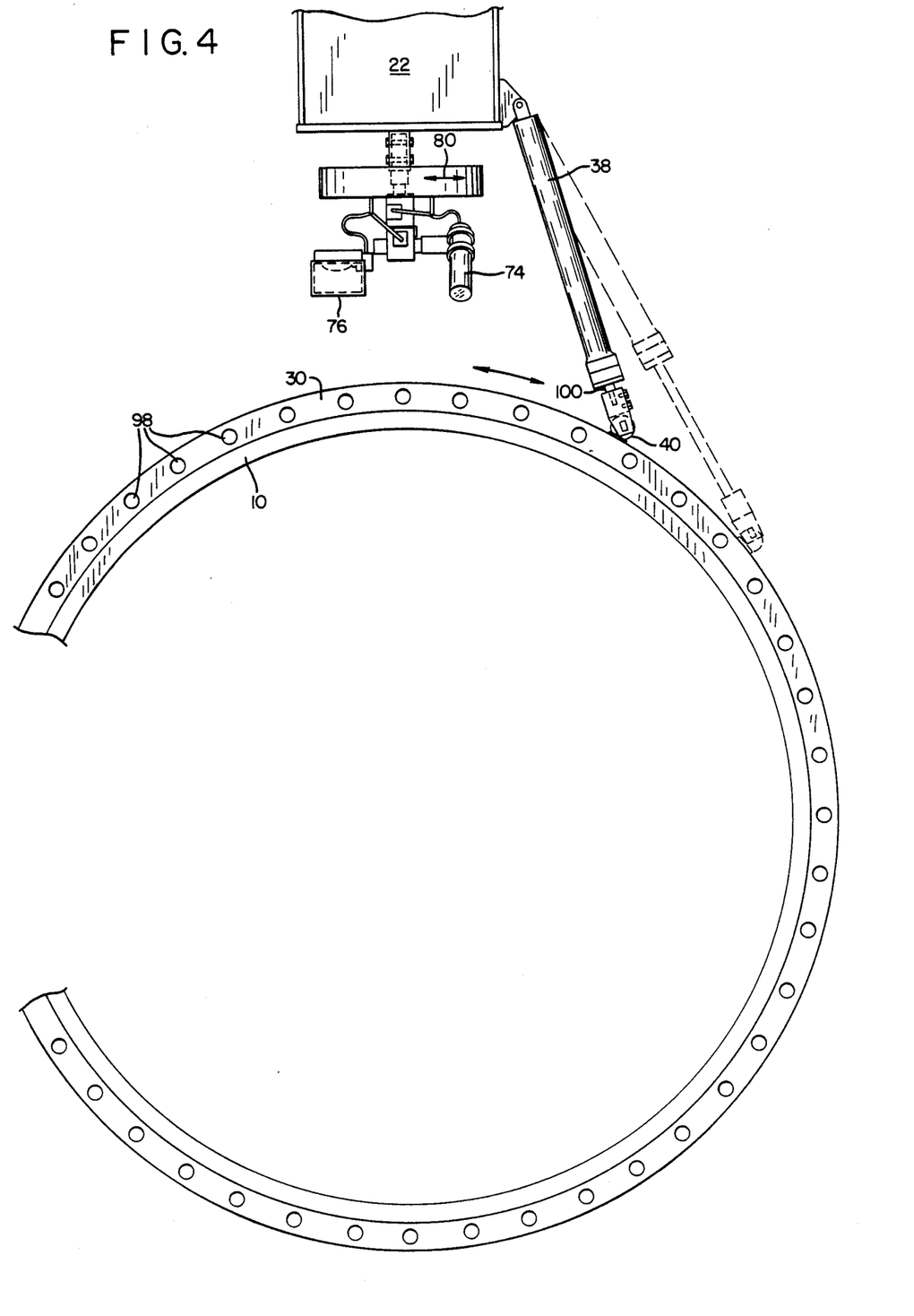
FIG. 4 is a view taken on view lines 4—4 of FIG. 3.

Reference is now made to FIGS. 1–4, with particular reference to FIGS. 3 and 4. Illustrated in FIGS. 3 and 4 is the rotating or rolling flange 30 of pipe section 10 to be bolted to the stationary flange 18 of pipe section 12. As previously explained, flange 30 is rotatable around the end of pipe section 10. With the pipe ends of pipe sections 10 and 12 in abutment, it is necessary to align the bolt holes 98 of flange 30 with bolt holes 94 of flange 18. This is achieved by rotating ring flange 30.

Depending from beam 22 is the hydraulic positioner 38 having its push rod 100 releasably fastened to eyelet 40, which in turn is permanently affixed to the ring flange 30. The fastening of the rod 100 to eyelet 40 is releasable as follows: At the end of rod 100, a pair of plates 102 straddle the eyelet with holes in the plates 102 aligned with the eyelet hole. A finger 104 carried by a lever 106 is projected through the aligned openings to fasten the rod 100 to the flange. The lever 106 is pivoted by a second hydraulic positioner 108 illustrated only in parts in FIG. 3. A bridge 110 maintains the desired relationship between the two positioners 38 and 108. Obviously, positioner 108 is actuated only for attachment and detachment purposes, with attachment occurring at the water's surface when the apparatus is mounted to the pipe sections. Detachment occurs when the apparatus is to be retrieved from the pipe section following bolt-up. As a precautionary measure, a spring is attached between the beam 22 and positioner 108 (not shown) so that when lever 106 with finger 104 is retracted the entire mechanism is pivoted away from the pipe section prior to raising the apparatus to the surface.

Positioning the rotatable flange 30 around the pipe section 10 (as permitted by bearing 172) is accomplished simply by extending the positioner 38. It will be observed from FIG. 4 that rotational movement of the ring flange 30 need only be accomplished through a few degrees, i.e. until any pair of holes 94,98 are brought into alignment. Such alignment is determined by the operator when the line markings 60 on the outside edge of both flanges 18 and 30 are aligned, such being observed by the operator through camera 74. Once the holes are aligned, the bolts 58 are ready to be pushed through the aligned openings and into pilot engagement with nuts 92, which operation and the mechanism therefor will now be explained.

Inserting the bolts and screwing them into nuts 92 is the function of the impact wrench 64, the carriage 66 and rigging 28. These features are best illustrated in Figs. 1, 2, 7 an d8. As illustrated, rigging 28 includes a track 112, comprised of three sections. Sections 112a and 112b are foldable section pivotally connected to a main section of track 112 as illustrated in FIG. 7. The foldable sections permit attachment to and detachment from the pipe section 10. Wrapping of the pivotally connected foldable sections 112a and 112b around the pipe is facilitated by hydraulic positioners 114. Sections 112a and 112b are interconnected by hook member 116 of sections 112b engaging pin 118 of section 112a. Engagement and disengagement of hook member 116 with pin 118 is achieved by actuation of positioner 120.

The track sections are spaced from the pipe wall by spacing lugs 122. These lugs are adjustable as noted to enable an ideal fit of the track to the pipe section. Welded to the track 112, 112a and 112b around the entire circumference is a chain 124 similar to a bicycle chain, adapted to be engaged by the teeth of a sprocket. Rails 174 surrounding the track 112 support rollers 126 carried by brackets 128 of the carriage 66.

Carriage 66 includes a pair of wrench mountings 130 interconnected by a tie strap 132 on which certain of the brackets 128 and rollers 126 are attached. Journaled on the wrench mounts are a pair of sprockets 134. The teeth of sprockets 134 are engaged with the roller chain 124 on the periphery of the track 112. The sprockets 134 are controllably driven, e.g. hydraulically by hydraulic motors 136, to position the carriage 66 at any position around the pipe section.

Figure 8:
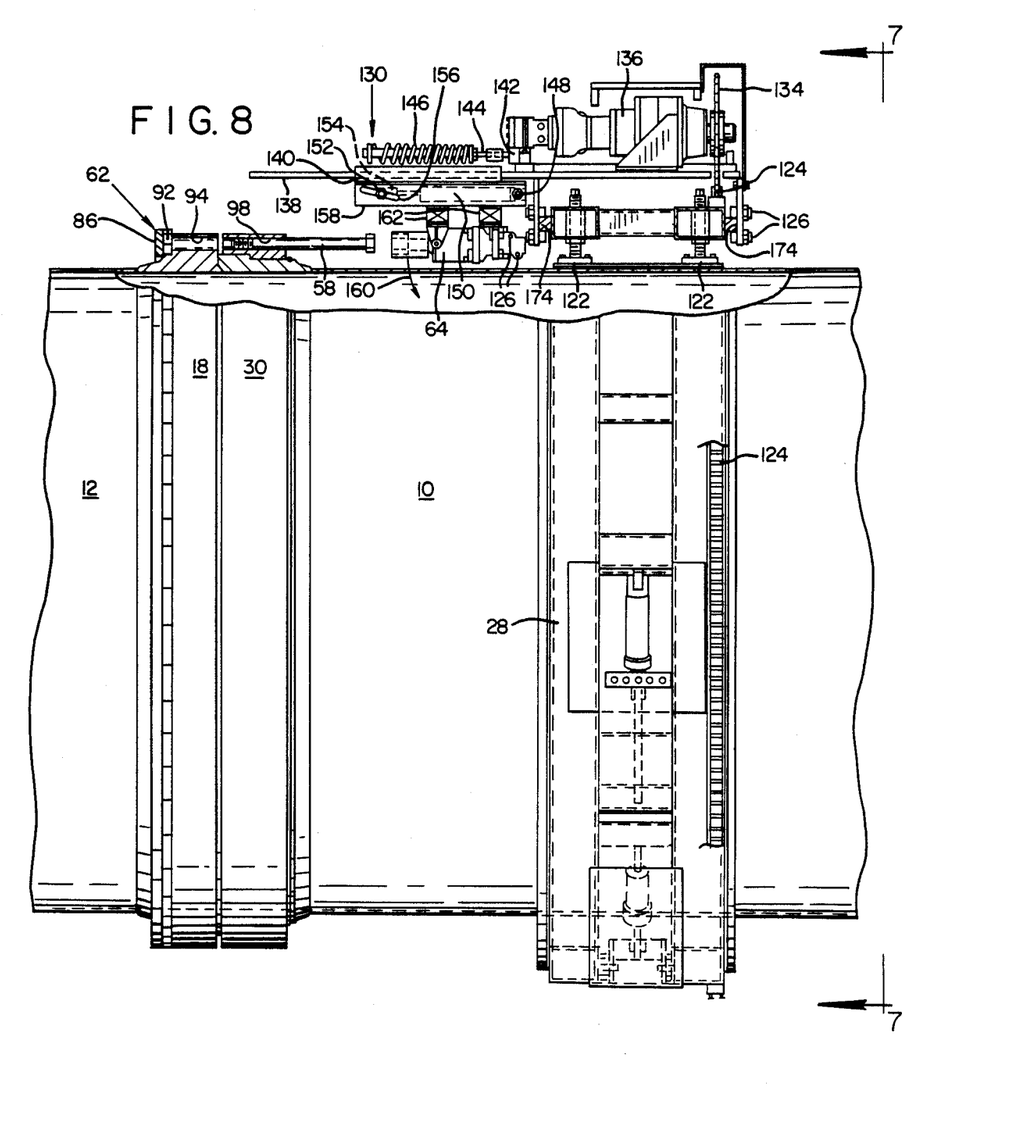
FIG. 8 is a view taken on view lines 8—8 of FIG. 7.

The impact wrench 64 and its control features are best illustrated in FIG. 8. The wrench mounting 130 includes a ramp 138 and a slide 140 extendable along the ramp. Extension of the slide 140 on ramp 138 is accomplished by positioner 142 (partially hidden behind motor 136). Rod 144 of positioner 142 is connected to the slide 140 via a cushion spring 146. It will be appreciated that slide 140 and wrench 64 are extended along ramp 138 for pushing the bolts through the flanges 18,30 and into nut 92 carried by retainer ring 62. When the bolts pilot section is "bottomed" in the nut, spring 146 functions as a spring cushion release, and will compress to prevent damage to the screw threads of the nut. Turning of the nut will then be commenced.

Returning to the wrench mounting, the wrench 64 is carried by a bracket 158 that is pivotally connected at pivot 148 to the slide 140. A positioning cylinder 150 fastened also to pivot 148 at one end, carries a slide pin 152 at it opposite end (on the rod). The pin 152 projects through slots 154,156 provided in the slide 140 and bracket 158 respectively. Slots 154 and 156 are angled relative to each other so that movement of slide pin 152 along the slots forces pivoting of the bracket 158 relative to the slide 140. The angular relationship of the slots determines the extent of relative pivoting and thus very small degrees of pivoting of bracket 158 can be accomplished with substantial extension of rod 144. The wrench 64 mounted to the bracket 158 can thus be altered angularly as indicated by arrow 160 to a very fine degree of control. Such angular control of the wrench, coupled with control of the peripheral movement of the carriage, enables the operator to precisely align the socket of the wrench 64 with the head of a bolt 58. The wrench, as will be noted in FIG. 8, is mounted to the bracket 158 through elastomeric grommets 162 which act as shock absorbers and allow for minor misalignments between socket and bolt head.

Once the wrench socket is aligned and then coupled with the bolt 58, the bolt is pushed by the wrench through the flange 18 and into the nut 92 as previously explained. Upon "bottoming" against the nut threads, the impact wrench simply turns the bolt to turn the threads of the bolt into the nut. A pre-established tightening is achieved at which point, as is typical of impact wrenches, the wrench mechanism starts to slip and turning is stopped.

This bolt-up procedure is viewed by a further camera-light assembly 67 attached to each carriage 66 (FIG. 2) and aligned so as to view the relative positions of the bolt head and wrench socket.

The bolt 58 is specially designed to cooperate with the floating feature of the nut retainer. As seen in Fig. 9, the bolt is provided with a pilot end section 164,166. The tapered tip 166 easily enters the opening through the nut 92 and forces the nut onto the straight unthreaded section 164. In the process the nut 92, if not in true alignment with the bolt shaft, will be forced into alignment as permitted by the "float" feature of the retaining ring previously described. With the nut and bolt in true alignment, there is no danger of the threads getting crossed. In an experimental apparatus without this feature, such crossing of threads was experienced from time-to-time, creating the need for drivers to go under the water and rectify the problem.

The rigging 28 is releasable from the pipe section by movement of hook member 116 affected by positioner 120. However this cannot occur until two acts of release preparation are carried out. As previously explained, the rigging 28 is not directly connected to the beam 22 except through the control lines. The reason is that rigging 28 is rather precisely located on the pipe relative to flange 30 and in the event that the beam is impacted for whatever reason and thus caused to shift even the slightest degree on the pipe section, the position of rigging 28 will not be affected. However in order to retrieve the rigging with the beam 22, it is necessary to attach the rigging to the beam. (The control line connection is not adequate for this purpose.) Attachment is accomplished by hooks 32 which pivot on pivot point 170 controlled by positioners 168. The hooks 32 are located over rungs 34 which provide for a wide latitude of misalignment. The hooks must be pivoted into rung-engaging position before the rigging is released from the pipe. The rungs 34 are carried by the carriage 66 and thus the location of the rungs under the hooks 32 also insures that the carriage and impact wrenches are properly positioned so as to permit release opening of the track sections 112a and 112b.

The apparatus of the invention permits underwater alignment and bolt-up of pipe sections with manual participation only required from a remote position at the surface of the water. Numerous features of the apparatus are believed unique and those skilled in the art will be capable of making many modifications of the described preferred apparatus without departing from the inventions provided by these features. The concept in general is encompassed by the claims appended hereto.

We claim:

1. A system for joining large pipe sections underwater comprising;

a pair of pipe sections, one pipe section being a prior pipe section previously laid and having an open and accessible end, and the other being a new pipe section having an end to be joined to the accessible end of the prior pipe section, a fixed flange on the accessible end of the prior pipe section, said flange having bolt holes, a flange that is rotatable about the end of the new pipe section and having bolt holes adapted for mated alignment with the bolt holes of the fixed flange, a nut positioning means adjacent the fixed flange of the prior pipe section and carrying nuts positioned in line with the bolt holes of the fixed flange and adapted for threaded engagement with bolts projected through the bolt holes;

an apparatus for releasable attachment to the new pipe section including a support beam having a gripper releasably clamping the support beam to the new pipe section, said beam extended over the rotatable flange end of the new pipe section and a fork-like appendage with fork legs depending from the extended-over-portion of the support beam, said fork legs adapted to straddle the prior pipe section inwardly of the fixed flange of the accessible end thereof, and positioning rams carried by the fork-like appendage extendible for pushing engagement with the fixed flange to force the beam inwardly on the prior pipe section with the new pipe section in tow forced toward the accessible end of the prior pipe section and into flange-to-flange abutment therewith;

a rigging releasably strapped around the new pipe section inwardly of the rotatable flange, said rigging forming a track around the pipe, a bolt inserting and turning tool carried by the rigging on said track, and positioning means for selectively positioning the tool on the track;

a positioner extending from the beam and releasably attached to the rotatable flange of the new pipe section;

control means for above-surface control by an operator of the positioning of the new pipe section so that the fork-like appendage of the attached apparatus straddles the prior pipe section, actuation of the ram positioning means for achieving abutting engagement of the flanges, actuation of the flange positioner attached to the rotatable flange for alignment of the bolt holes of the rotatable flange with the bolt holes of the fixed flange, actuation of the positioning means for the tool for successively locating the tool on the track of the rigging at the respective aligned bolt holes through the flanges, actuation of the tool for inserting the bolts through the aligned holes of the flanges and then into threaded engagement with the nuts, and release of the rigging, rotatable flange, and grippers for withdrawal of the apparatus to the water's surface; and underwater surveillance means to enable the operator to view the aligning of bolt-up operations as an aid to the control means.

2. A system as defined in claim 1 wherein bolts are partially pre-inserted in the bolt holes of the rotatable flange and said tool includes a carriage, a wrench, and a wrench extender whereby the wrench is first aligned with a bolt head, and then extended into engagement with the bolt and then to push the bolt through the bolt holes and turning the bolt into threaded engagement with the aligned nut.

3. A system as defined in claim 2 wherein the nut positioning means is a retaining ring having sockets formed in part by resilient spacers that retain the nut and prevent turning thereof while permitting axial shifting upon engagement by the bolt.

4. A system as defined in claim 3 wherein the bolt has a leading unthreaded pilot portion that enhances entry into the nut opening and induces axial shifting for thread alignment.

5. A method for underwater joining of flanges on the ends of large pipe sections which comprises;

releasably clamping a beam member to a new pipe section, said beam member carrying a pipe straddling fork extended over the end and outwardly of the flange of the new pipe section;

positioning the new pipe section and beam with the straddling fork straddling a prior pipe section to align the respective flanges on the ends of the new and prior pipe sections, and forcing inward movement of the straddling fork along the prior pipe section to force abutment of the two flanges;

releasably strapping a fastener-tool-carrying rigging to the new pipe section inward of the flange thereon said rigging supporting a tool for effecting fastening of the butted flanges; and releasing and retrieving the beam and rigging to be reclamped and restrapped to a succeeding new pipe section.

6. A method as defined in claim 5 wherein the pipe positioning means includes support lines depending from the water's surface, and at least one of the support lines is attached to the beam for controlling the positioning of that end of the beam through the line connected to the beam.

7. A method as defined in claim 6 wherein fastening is accomplished by bolting the flanges together, mated bolt holes provided through the flanges, the flange on the new pipe section being rotatable and rotated for aligning the bolt holes following flange alignment, bolts partially pre-inserted into the bolt holes of said rotatable flange, and nuts pre-positioned and aligned behind the bolt holes of the fixed flange, said tool being extendible and extended to push the bolts through the bolt holes and turn them into threaded engagement with the nuts.

8. A method as defined in claim 7 wherein the nuts are pre-positioned and fixed against turning and are free floating for axial adjustment, and the bolts are provided with a leading unthreaded pilot section that enters the nut hole and forces alignment for threading with the bolt threads.

9. A method as defined in claim 8 wherein the rigging is releasably attachable to the beam and is not attached for positioning and fastening, and attaching the rigging for unstrapping and retrieval of the rigging with the beam.

10. An apparatus for aiding in the joining of new and prior pipe sections underwater, wherein said pipe sections include end flanges, one of which is fixed to the prior pipe section and the other of which is rotatable on the new pipe section, said flanges having mated bolt holes, said apparatus comprising;

a beam, grippers carried by the beam adapted to releasably clamp the beam to the new pipe section with a portion of the beam extended over the rotatable flange end of the new pipe section, and a fork-like member depended from said extended end portion of the beam, said fork-like member having fork legs for straddling the prior pipe section in a pipe-laying process and thereby aligning the ends of the pipe sections;

positioning means carried by the fork-like members for forcing inward movement of the fork-like member and beam along the prior pipe section and thereby abutment of the pipe section ends;

a rotatable flange positioner extended from the beam and having means for releasably fastening the positioner to the rotatable flange for controlled rotation thereof to align the bolt holes of the flanges;

a rigging, and releasable strapping means for releasably strapping the rigging to the new pipe section, said rigging forming a track surrounding the pipe, a bolt-up tool movably mounted to the track and positioning means for positioning the bolt-up tool at selected positions on the track, said positioning means adapted to align the bolt-up tool with the aligned bolt holes, and the bolt-up tool adapted to bolt-fasten the flanges together.

11. An apparatus as defined in claim 10 wherein a surveillance camera is carried by the beam and positioned to observe the alignment and joining of the flanges of the pipe sections.

12. An apparatus as defined in claim 11 wherein the camera has controllable panning and tilting capabilities to enable an operator to observe various of the aligning and fastening operations.

13. An apparatus as defined in claim 10 including a nut retaining ring positioned behind the fixed flange on the prior pipe section, said retaining ring including an annular fixed edge against which one side of the nuts are positioned to thereby prevent turning, and resilient butterfly spacers engaging the nuts from two sides to retain the position thereof while permitting axial adjustment.

14. An apparatus as defined in claim 13 wherein bolts are partially pre-inserted into the bolt tholes of the rotatable flange, said bolts provided with a leading unthreaded pilot portion that fits into the nut opening and forces axial adjustment for aligning the threads of the bolt and nut.

15. An apparatus as defined in claim 10 wherein the positioning means are positioning rams carried by the fork-like members and extendable from said fork-like member for pushing engagement against the flange on the end of the prior pipe section, and landing gears including rollers on the fork-like members that engage the pipe to facilitate sliding of the fork-like member along the prior pipe section.

16. An apparatus as defined in claim 10 wherein the bolts have bolt heads and are partially inserted into the bolt holes of the rotatable flange, said bolt-up tool including a wrench for gripping the bolt heads and turning the bolts, a wrench extender including a slide member for extending the wrench toward the bolts and bolt holes in the flanges, a remotely controlled positioner controlling the positioning of said extender and a spring cushion release provided on the extender to limit the pressure applied to the bolt head, and a carriage carrying the extender and movable on the track of the rigging to position the wrench circumferentially around the pipe, and further including a wrench alignment means including a bracket pivotally connected at one end to the slide member and angularly offset slot openings respectively in the slide member and bracket, a pin projected through the slot openings and movable along the slots to force relative angular adjustment as between the bracket and slide to thereby adjust alignment of the wrench with the bolt heads, said pin being positioned by a remote controlled positioner.

17. An apparatus as defined in claim 16 wherein a roller chain is affixed to the rigging extending around the pipe adjacent the track, and said carriage including a rotatable sprocket engaged with the roller chain and upon rotation, moving the carriage along the chain for positioning the wrench, and remote controlled motor means for controllably turning the sprocket.

18. An apparatus as defined in claim 17 wherein said rigging is comprised of wrap-around sections that are forced open and closed by remotely controlled positioners, and a pivotal hook member carried by the support beam and pivotally controlled by a remote controlled positioner, and a hooking rung carried by the carriage to be hook-engaged by the hook member for attaching and detaching the rigging to the support beam.

19. An apparatus as defined in claim 15 wherein the landing gears include positioners that are individually controllable to fine-tune the concentric alignment as between the pipe ends.

20. An apparatus as defined in claim 11 including a further pair of surveillance cameras extended from the fork legs for viewing side alignment of the flanges, and a further surveillance camera extended from the rigging for viewing alignment of the bolt-up tool.

* * * * *